US005662773A

United States Patent [19]
Frederick et al.

[11] Patent Number: 5,662,773
[45] Date of Patent: Sep. 2, 1997

[54] PROCESS FOR PREPARATION OF CELLULOSE ACETATE FILTERS FOR USE IN PAPER MAKING

[75] Inventors: Tim J. Frederick; Melvin G. Mitchell; Lee R. Partin, all of Kingsport, Tenn.

[73] Assignee: Eastman Chemical Company, Kingsport, Tenn.

[21] Appl. No.: 375,765

[22] Filed: Jan. 19, 1995

[51] Int. Cl.$^6$ ................................................. D21H 13/06
[52] U.S. Cl. ........................ 162/4; 162/6; 162/7; 162/8; 162/9; 162/78; 162/82; 162/87; 162/88; 162/89; 162/90; 162/100; 162/146; 162/147; 162/157.6; 162/182; 162/189
[58] Field of Search ........................ 162/146, 182, 162/157.6, 191, 9, 100, 189, 147, 4, 5, 6, 8, 90, 87, 88, 89, 82, 78; 8/125, 129; 428/373

[56] References Cited

U.S. PATENT DOCUMENTS

| | | |
|---|---|---|
| 1,456,781 | 5/1923 | Kessler et al. . |
| 1,631,750 | 6/1927 | McIntosh . |
| 2,116,063 | 5/1938 | Dreyfus .............................. 8/129 |
| 2,208,653 | 7/1940 | Whitehead ...................... 162/146 |
| 2,239,782 | 4/1941 | Haney et al. . |
| 2,287,897 | 6/1942 | Martin . |
| 2,477,000 | 7/1949 | Osborne ........................... 162/146 |
| 2,632,686 | 3/1953 | Bashford et al. . |
| 2,887,429 | 5/1959 | Griggs ............................. 162/157.6 |
| 3,057,755 | 10/1962 | Malm et al. . |
| 3,093,534 | 6/1963 | Filling ............................. 162/146 |
| 3,396,061 | 8/1968 | Browne . |
| 3,781,949 | 1/1974 | Breen et al. . |
| 4,040,856 | 8/1977 | Litzinger . |
| 4,047,862 | 9/1977 | Keith . |
| 4,192,838 | 3/1980 | Keith et al. . |
| 4,460,647 | 7/1984 | Keith . |
| 4,512,849 | 4/1985 | Brandon et al. .................. 162/146 |
| 4,731,091 | 3/1988 | Majima . |
| 5,102,501 | 4/1992 | Eber et al. . |
| 5,213,883 | 5/1993 | Mehta . |
| 5,234,720 | 8/1993 | Neal et al. . |
| 5,328,934 | 7/1994 | Schiraldi ............................ 521/40 |

FOREIGN PATENT DOCUMENTS

| | | |
|---|---|---|
| 0 623 290 A1 | 4/1974 | European Pat. Off. . |
| 49-671 | 2/1975 | Japan . |
| 52-96208 | 8/1977 | Japan . |
| 52-96231 | 8/1977 | Japan . |
| 790039 | 2/1956 | United Kingdom . |

OTHER PUBLICATIONS

Gedon et al., "Cellulose Ester, Organic", *Kirk-Othmer Encyclopedia of Chemical Technology*, 5, pp. 510 & 520-524 (1993).

N. Eastman et al., "Cellulose Acetate and Triacetate Fibers", *Kirk-Othmer Encyclopedia of Chemical Technology*, 3, 5, pp. 105-108 (1979).

Synthetic Fibers in Papermaking, D. G. Bannerman, O. A. Battista, Interscience, New York 1964, pp. 69-70, 89, 273-277.

Modification of Paper Properties by the Chemical Modification of Pulp, Kapustova, Justina; Letenay, Alexej (Vysk. Ustav Papieru Celul., Bratislava, Czech.), Pap. Celul. 1970, 25 (6), 171-4.

Paperchem Abstract 73:3579 (Dudonis).

TAPPI (Tech. Assoc. of the Pulp and Paper Institute) Standard T 232 cm-85.

Derwent Abstract 80-2799c (abstract of JP 54151698).

Japanese Kokoku No. Sho. 49 (1974)-6761.

Y. Fahmy and S. El-Kalyoubi, "on Fibrous Acetylation of Cellulose. Acetylation of Paper Pulps", *Cellulose Chemistry and Technology*, 4, 1970, pp. 613-619.

Pahl, Brian L. and Herbert H. Espy, "Advanced Topics in Papermaking With Alkaline-Curing Polyamide Wet-Strength Resins", 1987 Advanced Topics in Wet End Chemistry Seminar, pp. 77-82.

Espy, Herbert H., "The Chemistry of Wet-Strength Broke Repulping", Progress in Paper Recycling, 1, Aug. 1992, pp. 17-23.

*Primary Examiner*—Peter Chin
*Attorney, Agent, or Firm*—Karen A. Hardin; Harry J. Gwinnell

[57] ABSTRACT

The present invention discloses a process for treating filter rods comprising cellulose acetate tow waste comprising the steps of:

a. cutting said filter rods so that fiber of said cellulose acetate have a fiber length of less than about 4 inches; and b. treating said cut filter rods with an aqueous base until at least 5% of acetyl groups on said cellulose acetate has been hydrolyzed.

Filter rods treated in this manner are suitable for use in various paper products. The process of the present invention may further include a step for repulping the cut filter rods to repulp any included plugwrap.

Modified fiber comprising cellulose acetate wherein at least 5% of acetyl groups on said cellulose acetate have been hydrolyzed, said fiber having a length of less than about 4 inches, are also disclosed.

Paper products comprising between about 5 and about 90% of the fiber of claim 21 and paper pulp are also disclosed.

21 Claims, No Drawings

PROCESS FOR PREPARATION OF CELLULOSE ACETATE FILTERS FOR USE IN PAPER MAKING

This invention relates to a process for preparation of cellulose acetate fibers which are useful for preparation of paper products. The fibers subjected to the process of this invention can are generally waste fibers from cigarette manufacturing.

BACKGROUND

The majority of cigarettes manufactured today have a filter composed of cellulose acetate fibers. Cigarettes having a cellulose acetate filter are typically prepared by using a continuous length of cellulose acetate fiber to prepare a long filter rod, then cutting the long filter rod into a multiplicity of shore lengths, or plugs, to form individual cigarette filters and then preparing a cigarette by attaching these filters to a tobacco column.

The above described process for preparation of cigarettes results in two waste streams of cellulose acetate fiber. The first waste stream results from preparing the cellulose acetate fiber into filter rods and individual filters and is often referred to in the tobacco industry as "plug room waste". Plug room waste typically comes from off specification filters and filters used for quality control.

The second waste material results from improperly manufactured cigarettes and is often referred to in the tobacco industry as "rip room waste". In addition to the cellulose acetate fiber, this material typically contains tobacco, paper and other materials.

These waste materials are currently being landfilled. However, because of the increasing cost of disposal and decreasing landfill space cigarette manufacturers and filter tow suppliers are looking for alternatives to disposal. Thus, there is a growing need for new uses for and suitable processing techniques of filter tow waste. Japanese Kokoku No. Sho. 49 (1974)-6761 discloses adding waste cellulose acetate filter tow to a paper-making process. In that process water is added to a beater machine and waste cigarette filter tow material is added. The resultant slurry is heated to 75° C. and caustic soda is added. The mixture is beaten for an extended period of time during which the pH of the solution drops from 11–12 to 6–7. This results in a reduction of the degree of acetylation of the cellulose acetate to 10–30% acetic acid. This is removal of over 50% of the acetyl from cellulose acetate. This treatment allows a paper-like sheet with high cellulose acetate content to be produced.

Other processes are known for uses of the waste filter tow material. U.S. Pat. No. 5,328,934 describes a process to upgrade the ripper room waste by a separation and supercritical fluid extraction. The product from this process is intended for dissolution in a cellulose acetate solvent.

Only the Japanese patent application mentions the use of the filter rods in paper. However, this reference requires a very deep hydrolysis. This level of hydrolysis is undesirable for several reasons. The loss in weight of the acetic acid removed lowers the yield of the process. The resultant acetic acid must be treated or recovered from a dilute aqueous stream. The deep hydrolysis also removes many of the potential benefits such as improved bulking or moldability which are derived from putting cellulose acetate, a thermoplastic, into paper.

Y. Fahmy and S. El-Kalyoubi ("on Fibrous Acetylation of Cellulose. Acetylation of Paper Pulps", Cellulose Chemistry and Technology, 4, 1970, pages 613–619) discloses producing a paper additive by acetylation of cotton and rice straw pulps followed by hydrolysis. Accordingly to Fahmy the acetylation is necessary to insure homogeneity of acetyl group distribution throughout the fiber, even after hydrolysis. Only fibers with homogeneous or near homogeneous acetyl group distribution have the properties disclosed by Fahmy.

Several articles describe repulping of wet-strength paper (Pahl, Brian L. and Herbert H. Espy, "Advanced Topics in Papermaking With Alkaline-Curing Polyamide Wet-Strength Resins", *TAPPI Seminar Notes*—1987 Advanced Topics in Wet End Chemistry, 1987, pages 77 to 82, Espy, Herbert H., "The Chemistry of Wet-Strength Broke Repulping", *Progress in Paper Recycling*, 1, Aug. 1992, pages 17 to 23). These articles state that repulping requires either 1) hypochlorite treatment at 120°–130° F. and a pH of 6.5 to 7.0 or 2) caustic treatment at a temperature of 160° F. and a pH of 11 to 12.

U.S. Ser. No. 08/375,140, filed herewith, (Docket 70145) discloses a process for preparing a similar product using either cellulose acetate filter tow as the feedstock.

DESCRIPTION OF INVENTION

The present invention discloses a process for treating filter rods comprising cellulose acetate tow comprising the steps of:

a. cutting said filter rod so that fibers of said cellulose acetate have a fiber length of less than about 4 inches; and b. treating said cut filter rods with an aqueous base until at least about 5% of acetyl groups on said cellulose acetate has been hydrolyzed.

Modified fibers and paper products made therefrom are also disclosed.

Filter rods treated in this manner are suitable for use in various paper products. The process may further comprise a step for repulping the filter rods to repulp any included plugwrap.

The filter rods must be shredded to expose the cellulose acetate fibers and to cut the very long fibers down to a processable size. Multiple passes through a cutting/shredding device (or multiple devices) are needed. At least two shredding stages are needed. The device needed should have a high speed cutting means. A screen, set of bars of other means of holding the filter rods while the cutting means shreds is advantageous. This device can be as simple as a chipper/shredder suitable for size reduction of leaves and branches in yard cleanup. Preferably a rotary inline cutter with screen such as the one produced by Precision Cutters, Inc. (Phillipsburg, N.J.) can be used. Multiple cutters or a single cutter with recycle of the large material can be used.

If the shredded filter rods are directly added to paper pulp, the fibers are lost from the sheet during processing and printing. This fibrous debris in unacceptable for most paper-making and printing processes. However, it has been surprisingly found that hydrolyzing the surface of the cut cellulose acetate fibers promotes bonding between cellulose acetate fibers and cellulose fibers. The amount of acetyl loss must be at least about 5% of the initial acetyl and preferably about 5 to about 15% and most preferably about 10% of the initial acetyl content. This hydrolysis produces a cellulose surface but also etches the surface to a roughened state that promotes adhesion of cellulose and cellulose acetate fibers. The hydrolysis can be carried out at temperature from about 20° C. up to about 100° C. Preferably the hydrolysis is carried out by adding at least about the amount of base necessary to accomplish the desired amount of hydrolysis and more preferably by adding about the amount of base necessary to accomplish the desired amount of hydrolysis. Suitable bases include hydroxides such as sodium hydroxide, calcium hydroxide, magnesium hydroxide and potassium hydroxide; carbonates with a pH greater than about 10, such as sodium carbonate and oxides which hydrolyze in water such as calcium and magnesium oxide. Preferably the base is NaOH. The desired amount of hydrolysis may be expressed as the amount of base necessary. Thus, when sodium hydroxide is used 0.018 grams of sodium hydroxide per gram of cellulose acetate is required to provide a 5% acetyl loss. When the pH of the slurry drops below 8, the reaction is complete. An excess of base can also be used. In this case the base must be neutralized or washed from the fibrous material at the desired extent of reaction.

If shredded filter rods are added directly to paper, the paper contains many translucent spots. It has been discovered that these spots are due to the plugwrap around the filter rods. The plasticizer from the cellulose acetate migrates to the plugwrap paper to produce the translucent spots. However, if the plugwrap is repulped into individual fibers, the translucent spots disappear. Generally the plugwrap from cigarette filters contains a wet-strength additive. This wet-strength additive causes the paper to retain its strength under normal repulping conditions.

Repulping filter rods may be accomplished via treatment with an oxidizing agent or caustic repulping. Treatment with an oxidizing agent is conducted at temperatures between about 40° and about 80° C., preferably from about 50° C. to about 55° C. and a pH of about 6.5 to about 11 depending on the oxidizing agent. Suitable oxidizing agents include sodium hypochlorite, hypochlorous acid, calcium hypochlorite, salts of hypochlorous acid and persulfate salts such as ammonium, potassium or sodium persulfate. Preferably the pH is between about 5 and about 8 and more preferably between about 6 and about 7 for hypochlorous acid or hypochlorite salts. When persulfate salts are used the pH is preferably between about 10 and 11. Preferably sodium hypochlorite is used.

Repulping may also be conducted via contact with. caustic at elevated temperatures. Suitable bases include hydroxides such as sodium hydroxide, calcium hydroxide, magnesium hydroxide and potassium hydroxide; carbonates with a pH greater than about 10 such as sodium carbonate and oxides which hydrolyze in water such as calcium and magnesium oxide. Preferably the caustic is NaOH and repulping is carried out at temperatures between about 60° and 100° C. and more preferably between about 65° and 75° C. The pH is maintained at a level greater than about 11, and most preferably from about 11 to about 12.

The repulping is preferably conducted in a high shear device. The paper industry uses several types of high shear repulping devices that could be used.

Preferably the surface hydrolysis step and the wet-strength repulping steps are combined. Treatment at 160° F. in a high shear device such as a pulper will accomplish both steps.

The fibers of the present invention comprise cellulose acetate wherein at least 5% of acetyl groups on said cellulose acetate have been hydrolyzed, said fiber having a length of less than about 4 inches.

The fibers may be added to wood pulp to make various paper products. The paper products may included between about 5 and about 90% of the fiber of the present invention. For certain uses the amount of of the fiber added is preferably between about 5 and about 60 weight % and more preferably between about 5 and about 30 weight %.

EXAMPLES

Example 1

Evidence of Translucent Spots

Four inch filter tow rods were cut and shredded by hand. The shredded filter tow rods were added to a 70% softwood (Weyerhauser Prince Albert)/30% hardwood (Aracruz eucalyptus at a level of 10 percent based on weight. The mixture was refined in a pilot scale valley beater to a Canadian Standard Freeness of 250 ml. Ten 40 $g/m^2$ handsheets were prepared from this stock. Translucent spots were produced in the paper. Held against a black background, these spots were counted for each of the ten sheets. The sheets contained an average of 28.8 spots per sheet, standard deviation of 10.9.

Example 2

Evidence of Plugwrap Causing Spots

Thirty grams of four inch filter tow rods were manually stripped of the plugwrap. The remaining filter rods were cut and shredded by hand. They were made into handsheets using the same procedure as Example 1. None of the handsheets contained translucent spots.

Example 3

Evidence of Acceptable Linting After Surface Hydrolysis

Four inch filter tow rods were fed to a Goosen shredder. The shredded rods were collected and fed through a second time. Twenty gallons of 165° F. water was charged to a pulper. 1.9 pounds of hardwood pulp, 1.6 pounds of softwood pulp and 3.5 pounds of shredded filter tow rods were charged to the water. 116 grams of 50% sodium hydroxide was charged. The mixture was agitated two minutes initially and for one minute every fifteen minutes for a total period of one hour. The slurry was isolated on a centrifuge. A 60 lb basis weight paper was made on a pilot scale Fourdrinier machine. The paper was cut into 9½ inch by 25 inch sheets. The sheets were printed on a five color Hiedelberg offset printing press. The prints showed acceptable print retention, slight linting and moderate debris.

Example 4

Evidence of Reduction in Translucent Spots After Caustic Treatment

Four inch filter tow rods were fed to a Goosen shredder (Goosen Industries, Beatrice, Nebr.). The shredded rods were collected and fed through a second time. 7.2 kilograms of water, 105 grams of shredded filter tow rods, 136.5 grams of softwood pulp (Weyerhauser Prince Albert), 58.5 grams of hardwood pulp (Aracruz eucalyptus were added to a five gallon, bottom-agitated pulper. After heating to 160° F., 7.64 grams of 50% sodium hydroxide were added. The slurry was agitated for one minute period every ten minutes. Every time the pH dropped to 9 an additional 1.91 gram charge of 50% sodium hydroxide was added. Four additional shots for a total 50% sodium hydroxide charge of 15.3 grams was added. 2.14 kilograms of this slurry, 150 grams of softwood, 64.3 grams of hardwood and 17.6 kilograms of water were added to a valley beater. This stock was refined to a Canadian Standard Freeness of 250 ml. Ten 40 g/m² handsheets were prepared. The sheets contained an average of 2 spots per handsheet with a standard deviation of 0.8.

Example 5

Lower Duration Caustic Treatment

The same procedure was followed as in Example 4 with the exception that when the initial 7.64 gram charge was consumed and the pH dropped to 8, the pulper treatment was stopped. Total treatment time was 3 hours and ten minutes. Handsheets were made in a similar manner. The sheets contained an average of 7.3 spots per sheet with a standard deviation of 2.6. This example shows that an extended pulper treatment is necessary.

Example 6

Treatment in Pulper without Caustic or Temperature

The same procedure was followed as in Example 4 except that the pulper was maintained at room temperature and no sodium hydroxide was added. After the pulper handsheets were prepared in a similar manner. The handsheets contained an average of 48.8 spots per sheet with a standard deviation of 9.4. This example shows that treatment in a pulper alone is not sufficient to eliminate the translucent spots.

We claim:

1. A process for treating cigarette filter rods comprising cellulose acetate tow comprising the steps of:
   a. cutting said filter rods so that fiber of said cellulose acetate tow has a fiber length of less than about 4 inches; and
   b. treating said cut filter rods with an aqueous base until about 5% to about 15% of acetyl groups on said cellulose acetate has been hydrolyzed.

2. The process of claim 1 wherein said base is selected from the group consisting of hydroxides, carbonates with a pH greater than about 10 and oxides which hydrolyze in water.

3. The process of claim 2 wherein said base is selected from the group consisting of sodium hydroxide, calcium hydroxide, magnesium hydroxide, potassium hydroxide, sodium carbonate, magnesium oxide and calcium oxide.

4. The process of claim 1 wherein said base is sodium hydroxide.

5. The process of claim 1 wherein said treating step is conducted at a temperature between about 20° C. and about 100° C.

6. The process of claim 3 wherein said base is used in an amount which is at least equal to the amount required to achieve at least 5% acetyl hydrolyzation.

7. The process of claim 6 wherein said base is used in an amount which is about equal to the amount required to achieve at least 5% acetyl hydrolyzation.

8. The process of claim 3 wherein said base is used in an amount which is at least equal to the amount required to achieve at least 10% acetyl hydrolyzation.

9. A process for treating cigarette filter rods comprising cellulose acetate tow comprising the steps of:
   a. cutting said filter rods so that fiber of said cellulose acetate tow has a fiber length of less than about 4 inches;
   b. treating said cut filter rods with an aqueous base until at least 5% of acetyl groups on said cellulose acetate has been hydrolyzed;
   c. repulping said cut filter rods;
   wherein said filter rod further comprises at least one additional component selected from the group consisting of a plasticizer, wet strength additive, paper or a mixture thereof.

10. The process of claim 9 further comprising the step of repulping said cut filter rod with an oxidizing agent.

11. The process of claim 10 wherein said oxidizing agent is selected from the group consisting of sodium hypochlorite, hypochlorous acid, calcium hypochlorite, salts of hypochlorous acid, ammonium persulfate, potassium persulfate and sodium persulfate.

12. The process of claim 11 wherein said oxidizing agent is hypochlorous acid or a sodium hypochlorite and said repulping is conducted at a temperature between about 40° and about 80° C. and a pH of about 5 to about 8.

13. The process of claim 11 wherein said pH is between about 6 and about 7.

14. The process of claim 11 wherein said oxidizing agent is a persulfate salt and said repulping is conducted at a temperature between about 40° C. and about 80° C. and a pH of about 10 to about 11.

15. The process of claim 12 wherein said oxidizing agent is sodium hypochlorite with a concentration of 0.5% to 2.0 weight % and said repulping is conducted with periodic or continual high shear agitation.

16. The process of claim 9 further comprising the step of repulping said cut filter rods via contact with a base at a temperature between about 60° and 100° C.

17. The process of claim 16 wherein said base is selected from the group consisting of sodium hydroxide, calcium hydroxide, magnesium hydroxide, potassium hydroxide, sodium carbonate, magnesium oxide and calcium oxide.

18. The process of claim 17 wherein said base is NaOH and said repulping is conducted at a pH of 9 to 13 with periodic or continuous high shear agitation.

19. The process of claim 17 wherein said repulping is conducted at a temperature between about 65° and 75° C.

20. The process of claim 18 wherein said repulping is conducted at a pH between about 11 and 12.

21. A paper product comprising between about 5 and about 90% of paper pulp and a modified fiber comprising cellulose acetate wherein at least 5% of acetyl groups on said cellulose acetate have been hydrolyzed, said fiber having a length of less than about 4 inches.

* * * * *